United States Patent
Goguelet et al.

(10) Patent No.: US 7,810,303 B2
(45) Date of Patent: Oct. 12, 2010

(54) HUMAN POWERED LAWNMOWER FRICTION WHEEL DRIVEN BLADE ASSEMBLY

(76) Inventors: Jacky Goguelet, 4 Westwood Cir., Dover, NH (US) 03820; Gwendolyn S. Goguelet, 4 Westwood Cir., Dover, NH (US) 03820

( * ) Notice: Subject to any disclaimer, the term of this patent is extended or adjusted under 35 U.S.C. 154(b) by 0 days.

(21) Appl. No.: 12/401,011

(22) Filed: Mar. 10, 2009

(65) Prior Publication Data
US 2009/0223195 A1   Sep. 10, 2009

Related U.S. Application Data

(60) Provisional application No. 61/068,676, filed on Mar. 10, 2008, provisional application No. 61/194,643, filed on Sep. 30, 2008.

(51) Int. Cl.
*A01D 34/52* (2006.01)
*A01D 34/73* (2006.01)

(52) U.S. Cl. ........................................... 56/255
(58) Field of Classification Search .............. 56/1, 56/2, 16.7, 198, 255, 295
See application file for complete search history.

(56) References Cited

U.S. PATENT DOCUMENTS

| | | | | |
|---|---|---|---|---|
| 437,808 A * | 10/1890 | Batcheller | ................ | 56/239 |
| 464,179 A * | 12/1891 | McCaul | .................... | 172/36 |
| 498,533 A * | 5/1893 | Clousing | .................... | 56/255 |
| 613,834 A * | 11/1898 | Burnet | ................... | 56/198 |
| 703,513 A * | 7/1902 | Adams et al. | .............. | 56/255 |
| 784,396 A * | 3/1905 | Hall | ......................... | 56/255 |
| 856,697 A * | 6/1907 | Hare | ......................... | 56/255 |
| 1,110,058 A * | 9/1914 | Hurley | ...................... | 56/255 |
| 1,275,851 A * | 8/1918 | Comfort | .................... | 56/255 |
| 1,308,909 A * | 7/1919 | Landon | .................... | 56/255 |
| 1,336,257 A * | 4/1920 | Muzzy | ..................... | 56/295 |
| 1,382,089 A * | 6/1921 | Allen et al. | ................ | 301/6.5 |
| 1,394,351 A * | 10/1921 | Pribnow | ................... | 56/294 |
| 1,528,391 A * | 3/1925 | Ariuchi | .................... | 56/255 |
| 1,558,568 A * | 10/1925 | St John | .................... | 56/255 |
| 1,591,775 A * | 7/1926 | Perling | .................... | 56/157 |
| 1,713,396 A * | 5/1929 | Rountree | ................... | 56/16.7 |
| 1,784,327 A * | 12/1930 | Allen | ....................... | 56/295 |
| 1,810,357 A * | 6/1931 | Lenhart | .................... | 56/10.3 |
| 1,889,830 A * | 12/1932 | Gravely | .................... | 56/14.7 |
| 2,032,701 A * | 3/1936 | Jones | ........................ | 56/238 |

(Continued)

FOREIGN PATENT DOCUMENTS

GB    2132865 A   *  7/1984

*Primary Examiner*—Árpád Fábián-Kovács
(74) *Attorney, Agent, or Firm*—James Ray & Assoc

(57) ABSTRACT

A human powered lawnmower includes a frame, a handle assembly having one end thereof pivotally secured to the frame and having an opposed end thereof extending in a rearward direction, a rear axle centrally secured on the frame at a rear end thereof, a rear wheel mounted on the rear axle for rotation thereabout, a pair of front ground cover engaging wheels are rotatably affixed in spaced apart relationship to the frame and a blade assembly having at least one blade thereof mounted on the frame and rotating in a substantially horizontal plane. A front axle is mounted on the frame for rotation thereabout and a pair of sprocket wheels and a drive chain are provided for rotating the front axle upon rotation of the rear wheel. A friction wheel mounted on the font axle and a plate attached to the blade's shaft are provided for rotating the blade.

17 Claims, 4 Drawing Sheets

U.S. PATENT DOCUMENTS

| | | | |
|---|---|---|---|
| 2,045,857 A * | 6/1936 | Hunter | 56/249 |
| 2,083,103 A * | 6/1937 | Steiner | 56/255 |
| 2,150,085 A * | 3/1939 | Todd | 56/238 |
| 2,171,750 A * | 9/1939 | Hooe | 56/255 |
| 2,193,276 A * | 3/1940 | Frush | 56/238 |
| 2,202,774 A * | 5/1940 | Harwell | 56/255 |
| 2,267,944 A * | 12/1941 | Osterholm | 56/255 |
| 2,602,953 A * | 7/1952 | Dalglish et al. | 16/437 |
| 2,900,660 A * | 8/1959 | Wuerker, Jr. | 16/437 |
| 3,029,887 A * | 4/1962 | Schantz | 180/19.3 |
| 3,130,444 A * | 4/1964 | Stollsteimer | 16/437 |
| 3,706,189 A * | 12/1972 | Rutherford | 56/13.4 |
| 4,341,058 A | 7/1982 | Chun | |
| D266,428 S * | 10/1982 | Green | D15/16 |
| 4,455,816 A * | 6/1984 | Porath | 56/249 |
| 4,688,376 A * | 8/1987 | Wolfe, Sr. | 56/16.7 |
| 5,274,987 A | 1/1994 | Wiener | |
| 5,388,393 A | 2/1995 | Woodling | |
| 5,511,445 A * | 4/1996 | Hildebrandt | 74/558.5 |
| 5,706,637 A | 1/1998 | Hamilton | |
| 7,516,602 B1 * | 4/2009 | O'Dell | 56/16.9 |
| 2007/0125057 A1 | 6/2007 | Hartman | |

* cited by examiner

HUMAN POWERED LAWNMOWER FRICTION WHEEL DRIVEN BLADE ASSEMBLY

CROSS-REFERENCE TO RELATED APPLICATIONS

This application is related to and claims priority from each of Provisional Patent Application Ser. No. 61/068,676 filed on Mar. 10, 2008 and Provisional Patent Application Ser. No. 61/194,643 filed on Sep. 30, 2008.

FIELD OF THE INVENTION

The present invention relates, in general, to lawnmowers and, more particularly, this invention relates to a human powered lawnmower.

BACKGROUND OF THE INVENTION

As is generally well known, conventional engine powered lawnmowers require use of expensive fossil fuel that emits greenhouse gases that adds to air pollution and global warming. They also contribute to noise pollution as each homeowner uses their lawnmower frequently during the warm summer months. Fuel must be drained from the fuel tank prior to storing the engine powered lawnmowers during the winter months so as to avoid difficulties of using the lawnmower in the spring. Furthermore, an engine powered lawnmower will continue to run with the spinning cutting blades until the engine is shut off and may cause injury if the user attempts to dislodge a blockage with a running lawnmower.

Even electrically powered lawnmowers, while easing the environmental pollution issues, are disadvantaged by higher than desirable electric energy costs, noise and either presence of an electrical cord or the need to recharge batteries.

Prior to the conception and development of the present invention efforts have been made to improve human powered lawnmowers that are operable either by pushing or pedaling. U.S. Pat. No. 4,341,058 issued to Chun and U.S. Pat. No. 5,388,393 issued to Woodling disclose a conventional bicycle updated with a blade assembly that is activated by pedaling. However, it has been found that a much greater than desired effort is required to ride the bicycle on a grass covered ground, thus essentially preventing many from using such lawnmower.

U.S. Pat. No. 5,274,987 issued to Wiener teaches a manual powered lawnmower utilizing a complex arrangement of pulleys, belts and shafts that increases the manufacturing and maintenance costs.

U.S. Pat. No. 5,706,637 issued to Hamilton discloses a four wheel human powered mower that utilizes a pair of chains to impart wheel motion and a pair of beveled gears to rotate a generally flat blade. However, it has been found that such human powered mower is often difficult to maneuver around shrubs and areas of uneven elevation. U.S. patent. application Ser. No. 11/647,840 published to Hartman under U.S. Pub. No. 2007/0125057 teaches a human powered lawnmower utilizing high-tech lightweight bicycle parts, low-friction bearings and bicycle tires but also utilizes a less than desirable rotary type blade and a greater than desirable number of drive chains.

Therefore, there is a need for an improved human powered lawnmower that is cost efficient to manufacture and simple and convenient to use.

SUMMARY OF THE INVENTION

In accordance with one aspect, the invention provides an improved human powered ground cover mower. The mower includes a frame having a predetermined shape. A handle assembly is provided and has one end thereof pivotally secured to the frame and has an opposed end thereof extending in a rearward direction. A rear axle is centrally secured on the frame at a rear end thereof. A rear wheel is mounted on the rear axle for rotation thereabout. There is a pair of front ground cover engaging wheels. Each of the pair of front wheel is rotatably affixed in spaced apart relationship to the frame. A blade assembly is provided and has at least one blade thereof mounted on the frame and rotating in a substantially horizontal plane. There is also means for rotating the at least one blade during movement of the mower.

In accordance with another aspect of the invention, therein is provided a human powered ground cover mower that includes a frame having an elongated tubular member disposed in a substantially vertical plane at an angle relative to the ground cover, a hollow cylinder secured to a lower end of the elongated member and having an axis thereof aligned in a horizontal plane when the mower is in use for mowing the ground cover and in a direction transverse to a direction of mowing, a first fork extending in a rearward direction and having a common end thereof secured to one end of the elongated member, and a second fork extending in the rearward direction and having a common end thereof secured to an opposed end of the elongated member, whereby respective free ends of the first and second forks are rigidly attached to each other. An elongated base is provided and is attached mediate ends thereof to the frame, the elongated base is disposed substantially horizontally when the mower is in the use for mowing the ground cover in the direction transverse to the direction of mowing, the elongated base has a pair of substantially planar spaced apart surfaces defining a uniform thickness throughout, wherein the hollow cylinder is disposed a predetermined distance above a top surface of the elongated base. There is a handle assembly that has a generally U-shaped portion, each free end of the generally U-shaped portion is pivotally connected to respective end of the elongated base, a first elongated tubular member secured to the U-shaped portion, at least one second elongated member disposed for linear telescopic motion within the first elongated tubular member and a handle secured to a free end of the at least one second elongated member. A rear axle is also provide and is affixed generally horizontally to the free ends of the first and second forks. A rear wheel is mounted on the rear axle for rotation thereabout. There is a pair of front ground cover engaging wheels, each of the pair of front wheels rotatably affixed to the respective end of the elongated base. A front axle is passed through the hollow cylinder and has each end thereof positioned in close proximity to the respective end of the elongated base. There is a pair of first bearings assemblies, each of the pair of bearing assemblies has a housing thereof secured to the respective end of the elongated base in spaced relationship with the top surface thereof and has a bearing thereof mounted within the housing and operatively receiving a respective end of the front axle so that the front axle rotates about a horizontally disposed rotational axis. There is also a pair of second bearing assemblies, each of the pair of second bearing assemblies has a housing thereof secured to the top surface of the elongated base mediate the respective end thereof and the hollow cylinder. A pair of vertically disposed shafts is provided, each of the pair of shafts has an upper portion thereof operatively received in a respective second bearing assembly so that the each shaft is free to rotate. There is a pair of generally flat cutting blades, each of the pair of cutting blades is secured to a lower end of a respective shaft for rotation in the horizontal plane. There is also a pair of plates, each of the pair of plates is secured to an upper end of the respective shaft substantially parallel to the top surface of the elongated base. A pair of resilient members is provided, each of the pair of resilient members is caged between a top surface of a respective second bearing assembly and a bottom surface of a respective plate and applying upward force thereto. There is also a pair of friction wheels, each of the pair of friction wheels is adjustably secured on the front axle mediate the respective end of the elongated base and the hollow cylinder and has a peripheral edge thereof disposed in each of a predetermined alignment and predetermined frictional engagement with a top surface of the respective plate. A sprocket wheel is secured on the rear spindle for rotation therewith. There is means for adjusting rotational speed of the pair of blades and including a derailleur mechanism mounted on the front axle, a shift level affixed to the handle and a Bowden cable having one end thereof secured to the derailleur mechanism and having an opposed end thereof secured to the shift lever. A drive chain is wrapped around the sprocket wheel and a sprocket portion of the derailleur mechanism. A shroud at least partially encloses a front portion of the mower.

In accordance with yet another aspect of the invention, the friction wheels and the plates are replaced with meshing beveled gears, wherein one beveled gear is secured on the front axle for rotation therewith and the other beveled gear is attached to upper end of the shaft.

OBJECTS OF THE INVENTION

It is, therefore, one of the primary objects of the present invention to provide a human powered lawnmower.

Another object of the present invention is to provide a human powered lawnmower that utilizes lightweight bicycle-type frame, drive chain and wheels.

Yet another object of the present invention is to provide a human powered lawnmower that is easy to maneuver around shrubs and areas of uneven elevation.

A further object of the present invention is to provide a human powered lawnmower that utilizes a friction arrangement for rotating the cutting blade or blades.

Yet a further object of the present invention is to provide a human powered lawnmower that allows the user to adjust rotational speed of the blade or blades.

An additional object of the present invention is to provide a human powered lawnmower that is economical to manufacture.

Another object of the present invention is to provide a human powered lawnmower that is simple to use.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
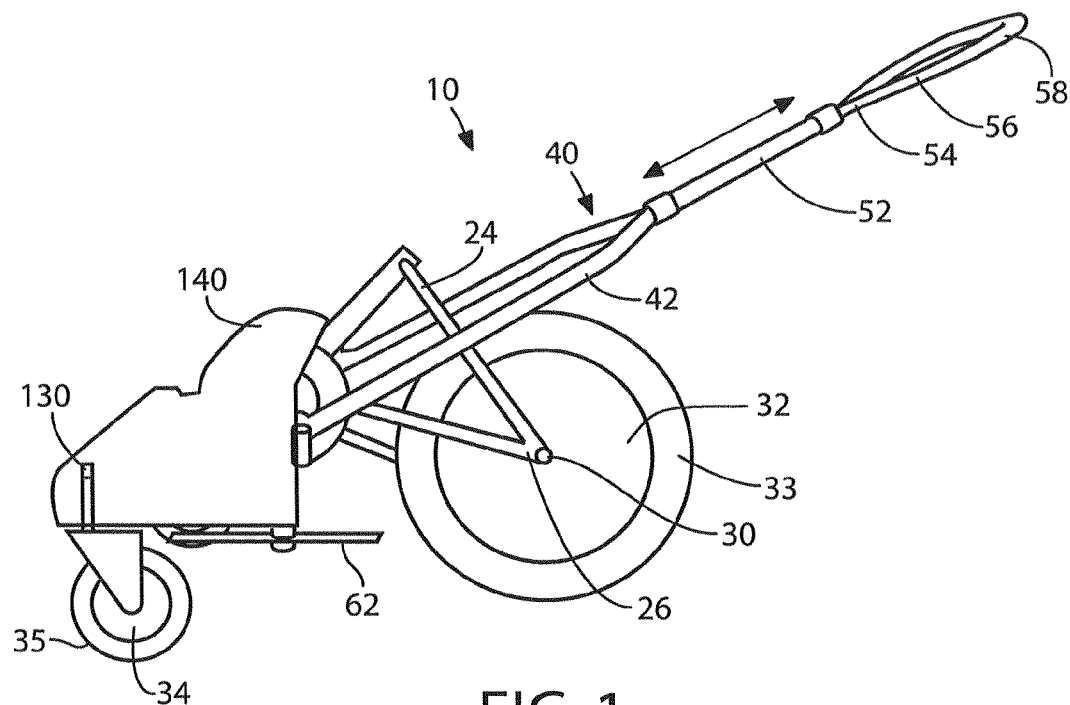
FIG. 1 illustrates a side perspective view of a human powered mower that is constructed in accordance with one embodiment of the present invention.

Prior to proceeding to the more detailed description of the present invention, it should be noted that, for the sake of clarity and understanding, identical components which have identical functions have been identified with identical reference numerals throughout the several views illustrated in the drawing figures.

Figure 2:
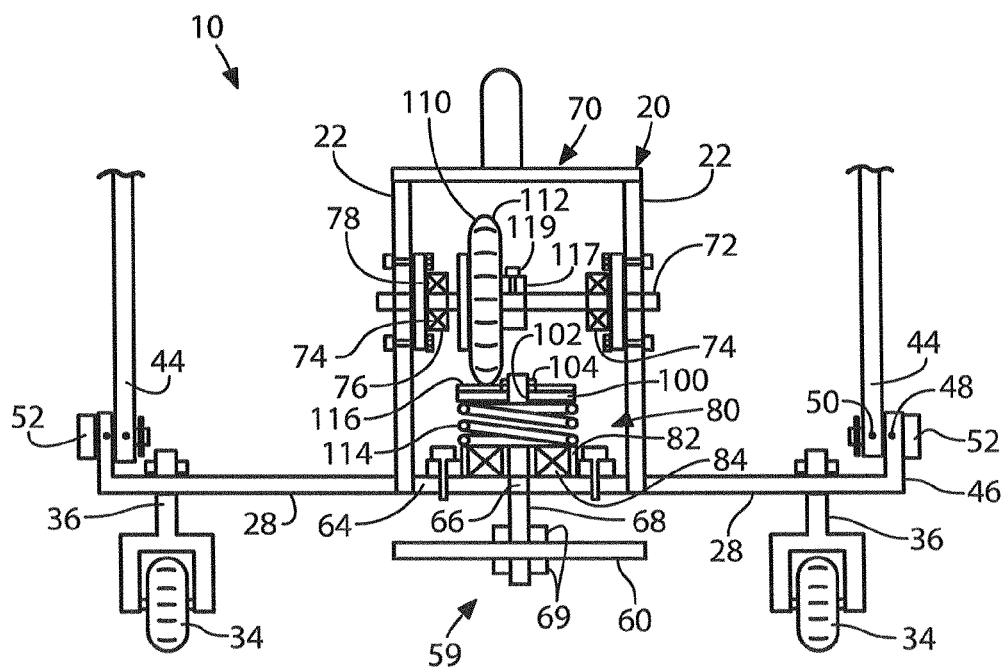
FIG. 2 illustrates a front view of the human powered mower of FIG. 1.
Figure 4:
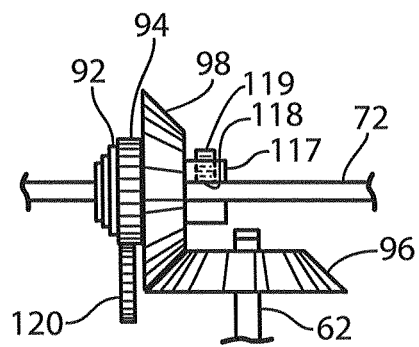
FIG. 4 is a front view of the human powered mower of FIG. 1, particularly illustrating alternative blade rotation.
Figure 3:
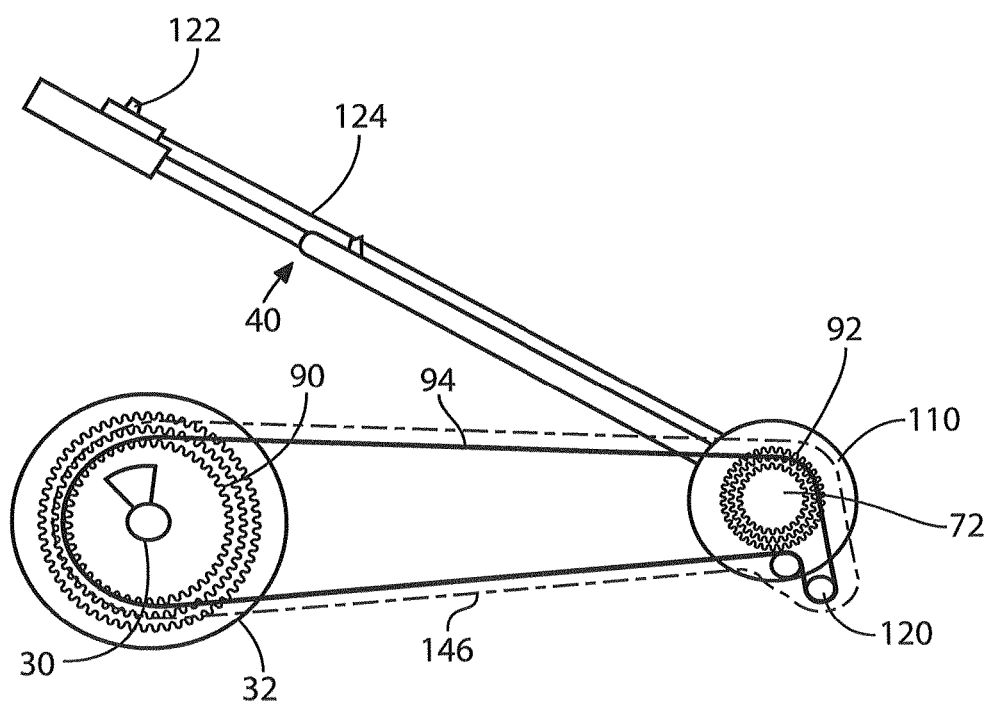
FIG. 3 illustrates a side elevation view of the human powered mower of FIG. 1.
Figure 5:
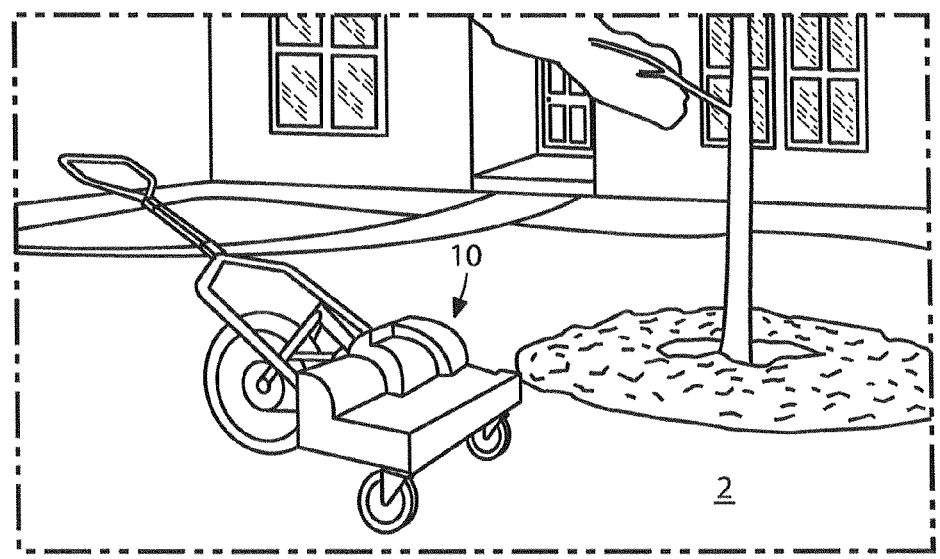
FIG. 5 is an environmental view illustrating use of the human powered mower of FIG. 1.
Figure 6:
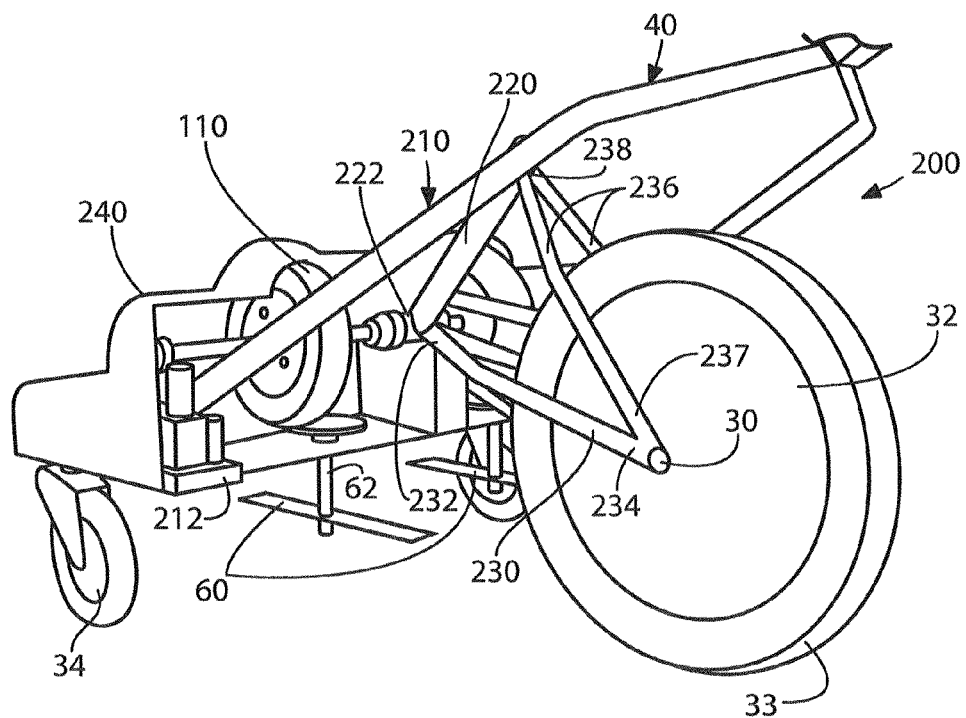
FIG. 6 illustrates one side perspective view of a human powered mower that is constructed in accordance with a presently preferred embodiment of the invention.
Figure 7:
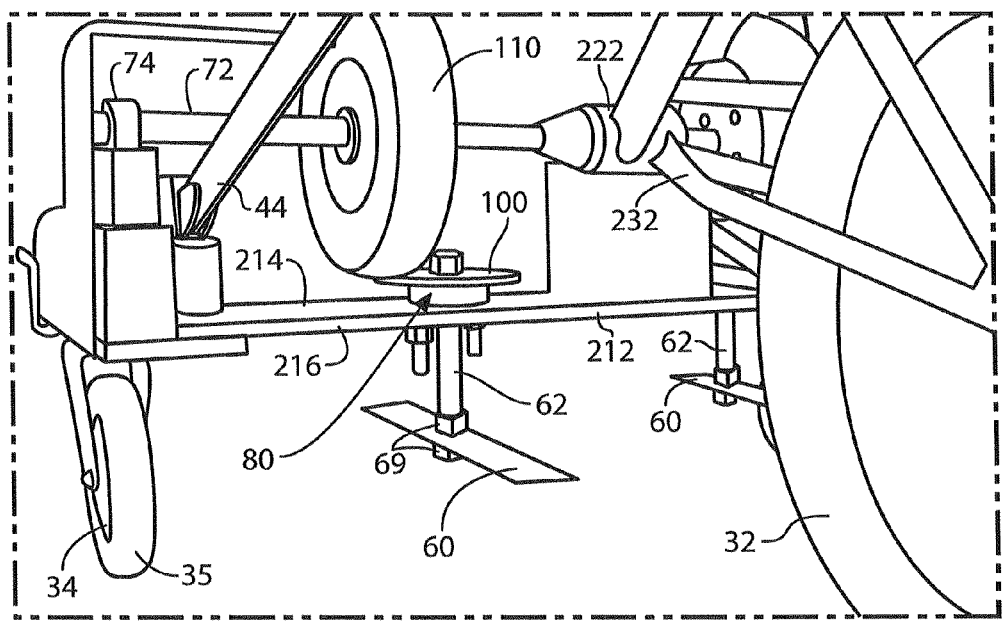
FIG. 7 is a partial rear perspective view of the human powered mower of FIG. 6.
Figure 8:
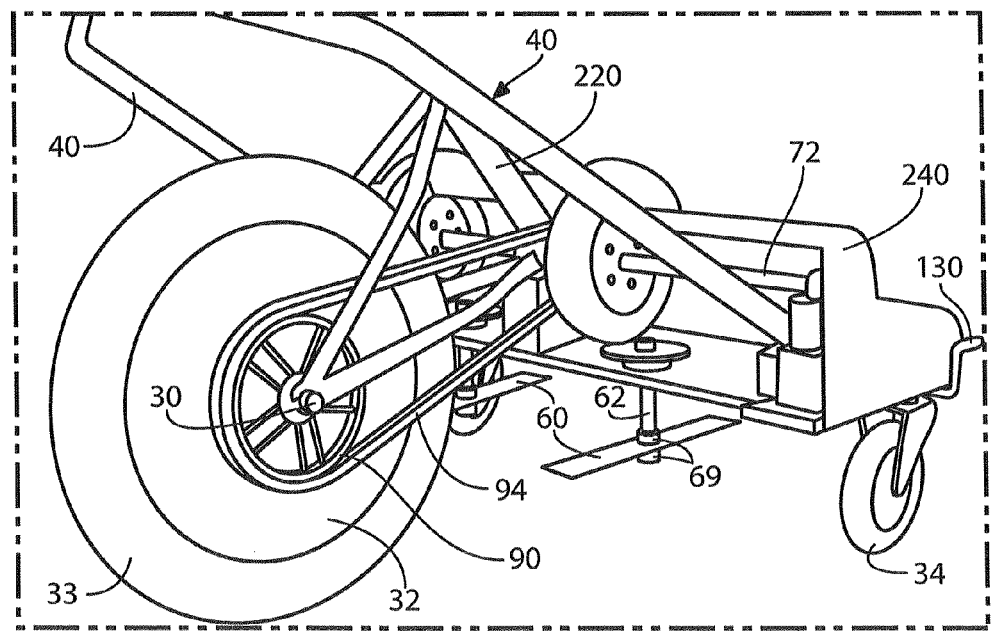
FIG. 8 illustrates another side perspective view of the human powered mower of FIG. 6.

The best mode for carrying out the invention is presented in terms of its embodiments, herein depicted within FIGS. 1 through 8. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The present invention provides a human powered lightweight lawnmower that is easy to maneuver around shrubs and areas of uneven elevation.

Reference is now made, to FIGS. 1-5, wherein there is shown a human powered ground cover mower, generally designated as 10, which is constructed in accordance with one embodiment of the invention. The mower 10 includes a frame 20 having a predetermined shape. It is contemplated for the frame 20 to include a pair of vertically disposed side members 22 that are spaced apart is a substantially parallel relationship to each other. The side members 22 have a pair of opposed substantially planar surfaces, although use of hollow tubular side members 22 is also contemplated. The frame 20 also includes at least a pair of rear wheel supporting members 24 extending in a rearward direction and in a spaced apart relationship to each other. Proximal ends of such at least a pair of rear wheel supporting members 24 are rigidly attached to the frame 20 while distal ends of such at least a pair of rear wheel supporting members 24 define rear end 26 of the frame 20. A rear axle 30 is centrally secured on the frame 20 at the rear end 26 thereof in a manner that is substantially identical to arrangement for securing a rear wheel on a conventional bicycle. A rear wheel 32 having a predetermined diameter is mounted on the rear axle 30 for rotation thereabout. The rear wheel 32 has an elastomeric tire 33, preferably of an inflatable type.

There is also a pair of front ground cover engaging wheels 34, each of the pair of front wheel 34 rotatably affixed in spaced apart relationship to the frame 20. By way of an example only, the stem 36 of each front wheel 34 is secured to a respective one of a pair of horizontally disposed and outwardly extending elongated members 28 of the frame 20. The proximal end of the elongated member 28 is rigidly attached to a respective side member 22. At least a peripheral edge 35 of each front wheel 34 is manufactured from an elastomeric or polymer material. Preferably, the front wheels 34 are of a swivel type to enhance maneuverability of the apparatus 10 particularly for use around shrubs or trees as well as for use in areas of uneven elevation.

A handle assembly 40 is also provided and has a generally U-shaped portion 42 with a pair of free ends 44. Preferably, each free end 44 of the generally U-shaped portion 42 is pivotally connected to a respective distal end of the horizontally disposed elongated member 28. By way of the example only of FIG. 1, such distal end may be provided with an upward flange 46 having an aperture 48 formed through a thickness thereof. The free end 44 of the generally U-shaped portion 42 is then provided with a complimentary aperture 50. Finally, a pin 52 is passed through these apertures 48, 50. The handle assembly 40 also includes a first elongated tubular member 52 having a proximal end thereof rigidly attached to the U-shaped portion 42 and having a distal end thereof extending in a rearward direction. At least one second elongated member 54 is disposed for linear motion within the first elongated tubular member 52. A handle, which may be a conventional handle bar, 56 is secured to a free end of the at least one second elongated member 54. Such handle 56 may be covered with an elastomeric or polymer cover 58 for ergonomic reasons. Pivotal attachment of the handle assembly 40 and use of the telescopically adjustable handle 56 enables the user to adjust position of such handle 56 to fit his or her height and/or preference in pushing the mower 10.

The mower 10 also includes a blade assembly 59 having a generally flat blade 60 thereof mounted on the frame 20 and rotating in a substantially horizontal plane. For example, the blade 60 is secured to a lower end of the shaft 62. The opposed upper end of the shaft 62 is connected to a horizontal member 64 rigidly secured between the side members 22 of the frame 20 and having an aperture 66 formed therethrough. It is contemplated by the present invention that the position of the blade 60 may be adjusted in a vertical direction. By way of one example only, the lower end of the shaft 62 may be threaded and the blade 60 is then caged between a pair of nut fasteners 69. Thus, the user of the mower 60 may simply adjust the vertical position of the blade 60 by selectively loosening, moving and tightening fasteners 69.

The present invention also provides means, generally designated as 70, for rotating the blade 60 during movement of the mower 10. Such blade rotating means 70 includes a front axle 72 disposed in the direction transverse to the direction of mowing and further disposed above the horizontal member 64. A pair of first bearings assemblies 74 is provided. Each of the pair of first bearing assemblies 74 has a housing 76 thereof secured to an inner surface of the respective side member 22 of the frame 20 and has a bearing 76 thereof operatively receiving a respective end of the front axle 72 so that the front axle 72 rotates about a horizontally disposed rotational axis. It must be also noted, that each free end 44 of the generally U-shaped portion 42 of the handle assembly 40 may be pivotally connected to a respective end of the front axle 72.

A second bearing assembly 80 is provided and has a housing 82 thereof secured to the top surface of the horizontal member 64. The bearing 84 of the second bearing assembly operatively receives the upper end of the shaft 62 so as to substantially minimize frictional forces during rotation of the blade 60.

A first sprocket wheel 90 is secured on the rear axle 30 for rotation therewith. A second sprocket wheel 92 is secured on the front axle 72 for rotation therewith. A drive chain 94 is wrapped around each of the first and second sprocket wheels, 90, 92 respectively.

To enable rotation of the blade 60, the present invention may provide a first beveled gear 96 secured for rotation in the horizontal plane on the upper end of the shaft 62 extending past the housing 82 and the second gear secured 98 for rotation in a vertical plane on the front axle 72 and operatively meshing with the first beveled gear 96. In operation, when the user pushes the mower 10, the rotation of the rear wheel 30 causes the front axle 72 to rotate and further causes rotation of the blade 60 by way of the rotating beveled gears 96, 98.

However, it is presently preferred to secure, in a horizontal plane, a plate 100 to the upper end of the shaft 62. For example, the plate 100 may be provided with a central aperture 102 formed therethrough and secured to a threaded upper end of the shaft 62 with a nut 104. Thus, the plate 100 rotates with the blade 60. There is also a friction wheel 110 that is secured on the front axle 72 for rotation therewith in each of an alignment and a predetermined frictional engagement with a top generally planar surface of the plate 100. Preferably, the peripheral edge 112 of the friction wheel 110 is convexed to provided a generally line contact with the top surface of the plate 100. At least the peripheral edge 112 is manufactured from elastomeric or polymer material, including combination thereof. A resilient member 114 is caged between a top surface of the housing 82 and a bottom surface of the plate 110 and applies upward force thereto. Such resilient member 114 may be a conventional coiled spring. Preferably, the size of such resilient member 114 in the horizontal plane is substantially identical to the size of the plate 110 so as to at least substantially limit tilting of the plate 110 relative to the shaft 62 during use. The top surface of the plate 110 may be provided with a friction liner 116 manufactured either from elastomeric or polymer material, including combination thereof, so as to reduce slippage between the peripheral edge 112 of the friction wheel 110 and the plate 100. In operation, when the user pushes the mower 10, the rotation of the rear wheel 30 causes the front axle 72 to rotate, by way of the sprocket wheels 90, 92 and the drive chain 94, and further causes rotation of the blade 60 by way of the friction wheel 110 and the plate 100.

Preferably, there is means for adjustably mounting the friction wheel 110 on the front axle 72 which may include a conventional hub 116 of the friction wheel 110 and a threaded fastener 120 received in a threaded aperture 118 formed through a wall of the hub 116 and having a distal end thereof frictionally engaging the outer surface of the axle 72. The advantage of such adjustable mounting, is that the friction wheel 110 may be adjusted toward to or away from the shaft 62, thus changing the rotational ratio between the rotational speed of the front axle 72 and the rotational speed of the blade 60. It would be understood that moving the friction wheel 110 toward the shaft 60 increases the rotational ratio, thus enabling faster rotation of the blade 60.

The present invention may also provide optional means for further adjusting rotational speed of the blade 60. Such means includes a derailleur mechanism 120 mounted on the front axle 72 and integrating the second sprocket wheel 92 therewithin, a shift level 122 affixed to the handle 56 and a Bowden cable 124 having one end thereof secured to the derailleur mechanism 120 and having an opposed end thereof secured to the shift lever 124. Any conventional derailleur mechanism 120 presently in use on bicycles may be employed in the present invention and, therefore, the detail description of such derailleur mechanism 120 is omitted in this document for the sake of brevity. It is also within the scope of the present invention to integrate the sprocket wheels of the derailleur mechanism 120 with either the first bevel gear 96 or the friction wheel 110. Advantageously, the derailleur mechanism 120 aids in eliminating slack of the drive chain 94.

The mower 10 may also include optional means for adjusting height of the blade 60 relative to the ground cover 2 by adjusting the position of each of the pair of front ground cover engaging wheels 34 relative to the frame 20. By way of an example only of FIG. 1, such front wheel vertical position adjusting means includes a pair of screw based crank mechanisms, each of the pair of crank mechanisms operatively connected to a respective one of the pair of front ground cover engaging wheels 34 and having a manually operable handle 130 for ease of vertical position adjustments. However, the present invention contemplates employment of any other conventional arrangements for adjusting the vertical position of the front ground cover engaging wheels 34.

A shroud 140 is also provided at the front of the mower 10 and at least partially encloses each of the frame 20, front axle 72, and the friction wheels 110. Preferably, the shroud 140 is manufactured from a translucent or transparent plastic material enabling the user to observe and inspect proper operation of the mower 10 without the need to remove such shroud 140. A chain and sprocket guard 146 may be also provided.

In operation, the user simply applies manual force to the handle 56 in order to initiate movement of the mower 10 in a direction of mowing. Subsequently, rotation of the rear wheel 32 causes the front axle 72 rotate by way of rotating sprocket wheels 90, 92 and rotating drive chain 94 and further causes rotation of the blade 60.

In accordance with a presently preferred embodiment of the invention, there is provided a human powered mower, generally designated as 200, that is constructed generally similar to the above described mower 10, except for using a pair of blade assemblies 50 each having the generally flat blade 60 thereof mounted for rotation in a horizontal plane.

Accordingly, the mower 200 includes a frame 210 that is modified to receive such pair of blades 60. The frame 210 is adapted with an elongated base 212, which is essentially a plate having a pair of opposed substantially planar surfaces 214 and 216. It would be understood that the elongated base 212 may be essentially provided by a combination of elongated members 28 and 64 of the above described mower 10. An elongated member 220, being preferably of a hollow tubular construction, is disposed in a substantially vertical plane at an angle relative to the ground cover and has a lower end thereof secured to the elongated base 212 mediate ends thereof. A hollow cylinder 222 is interposed within the elongated member 220 in proximity to a lower end thereof. The longitudinal axis of the hollow cylinder 222 is aligned in a horizontal plane when the mower 200 is in use for mowing the ground cover 2 in the direction transverse to the direction of mowing. The hollow cylinder 222 is spaced a predetermined distance from the top surface 214 of the elongated base 212. At least one or a pair of bearings (not shown) may be mounted within the hollow cylinder 222 providing additional support to the front axle 72.

There is a first fork 230 having a common end 232 thereof secured to one end of the elongated member 220, and a second fork 236 having a common end 238 thereof secured to an opposed end of the elongated member 220. Respective free ends of the first and second fork, 234 and 237 respectively, are rigidly attached to each other. The rear axle 30 is secured to the respective free ends of the first and second fork 230, 236.

The mower 200 also includes a pair of second bearings 80, a pair of friction wheels 110 and a pair of plates 100 to rotate the pair of blades 60. Alternatively, a pair of first bevel gears 96 and a pair of second beveled gears 98 may be provided to rotate the blades 60.

Each first bearings assembly 74 is secured to a respective end of the elongated base 212 in a spaced relationship with the top surface 214 thereof. A shroud 240 is also provided at the front of the mower 200 and at least partially encloses each of the first axle 72, the elongated base 212 and the pair of friction wheels 110. Preferably, the shroud 240 is manufactured from a translucent or transparent plastic material enabling the user to observe and inspect proper operation of the mower 200 without the need to remove such shroud 240. A chain and sprocket guard (not shown) may be also provided.

Employment of a pair of blades 60 allows for a smaller length of each blade 60 thus minimizing the rotating inertia thereof. It also enables the user to independently adjust vertical position of each blade 60 and thus stagger cutting height of the ground cover 2, when desired, so as to reduce the strain onto the mower 200. This staggering condition may be necessary when the ground cover is too tall or wet.

Due to use of lightweight tubular members and absence of the internal combustion engine or electric motor, either the mower 10 or 200 weighs no more than sixty (60) pounds and can easily and simply pushed by user of any physical strength. Further absence of internal combustion engine or electric motor causes the blade rotation to cease substantially simultaneously with the termination of the pushing or pulling action. Thus, even minors can operate the mower 10 or 200 of the present invention. Equally as well, absence of internal combustion engine or electric motor eliminates the need for expensive adjustments and/or periodic tune-ups. Finally, the mower 10 or 200 does not produce environmental pollutants or noise.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A human powered ground cover mower comprising:
   (a) a frame;
   (b) a handle assembly having one end thereof pivotally secured to said frame and having an opposed end thereof extending in a rearward direction;
   (c) a rear axle centrally secured on said frame at a rear end thereof;
   (d) a rear wheel mounted on said rear axle for rotation thereabout;
   (e) a pair of front ground cover engaging wheels, each of said pair of front wheel rotatably affixed in spaced apart relationship to said frame;
   (f) a blade assembly having at least one blade thereof mounted on said frame and rotating in a substantially horizontal plane; and (g) a front axle disposed in said direction transverse to said direction of mowing;

(h) a pair of first bearings assemblies, each of said pair of bearing assemblies having a housing thereof secured to said frame in a spaced apart relationship to each other, said each of said pair of bearing assemblies having a bearing thereof operatively receiving a respective end of said front axle so that said front axle rotates about a horizontally disposed rotational axis;

(i) at least one second bearing assembly having a housing thereof secured to said frame;

(j) at least one vertically disposed shaft operatively received in a bearing of said at least one second bearing assembly, said at least one vertically disposed shaft having a lower end thereof secured to said at least one blade and having an opposed upper end thereof extending above said housing of said at least one second bearing assembly, (k) arrangement connecting said rear axle to said front axle, whereby rotation of said rear axle causes rotation of said front axle;

(l) at least one plate secured to an upper end of said at least one shaft and disposed in said horizontal plane;

(m) at least one friction wheel secured on said front axle for rotation therewith and having a peripheral edge thereof disposed in each of a predetermined alignment and a predetermined frictional engagement with a top surface of said at least one plate; and (n) at least one resilient member caged between a top surface of said housing of said at least one second bearing assembly and a bottom surface of said at least one plate and applying upward force thereto.

2. The mower, according to claim 1, wherein said frame includes a pair of spaced apart and vertically disposed elongated side members, a pair of horizontally disposed elongated members, each of said pair of horizontally disposed elongated members having a proximal end thereof disposed on and rigidly secured to an outer surface of a respective side member and having a distal end thereof extending outwardly in a direction transverse to a direction of mowing, and at least a pair of rear axle supporting members extending in a rearward direction and carrying said rear end of said frame thereon, whereby said each of said pair of front wheel is rotatably affixed to a respective horizontally disposed elongated member at said distal end thereof and whereby said rear axle is secured to free ends of said at least a pair of rear axle supporting members.

3. The mower, according to claim 1, wherein said frame includes an elongated base disposed in a horizontal plane and transverse to a direction of mowing, an elongated member disposed in a substantially vertical plane at an angle relative to said ground cover, a hollow cylinder secured to a lower end of said elongated member and having a longitudinal axis thereof aligned in said horizontal plane when said mower is in use for mowing said ground cover in said direction transverse to said direction of mowing, said hollow cylinder spaced a predetermined distance from a top surface of said elongated base, a first fork having a common end thereof secured to one end of said elongated member, and a second fork having a common end thereof secured to an opposed end of said elongated member, whereby respective free ends of said first and second fork are rigidly attached to each other, and whereby said rear axle is secured to said respective free ends of said first and second forks.

4. The mower, according to claim 1, wherein said mower includes means for adjusting rotational speed of said at least one blade.

5. The mower, according to claim 4, wherein said blade rotational speed adjustment means said means includes a derailleur mechanism mounted on said front axle and incorporating said second sprocket wheel therewithin, a shift level affixed to said handle and a Bowden cable having one end thereof secured to said derailleur mechanism and having an opposed end thereof secured to said shift lever.

6. The mower, according to claim 1, wherein said mower includes at least one friction liner mounted on a top surface of said at least one plate.

7. The mower, according to claim 1, wherein said handle assembly includes at least a pair of telescopic portions disposed mediate ends thereof so as to position said opposed end of said handle assembly at a predetermined height above said ground cover.

8. The mower, according to claim 1, wherein said handle assembly includes a covering disposed on said distal end thereof, said covering manufactured from at least one of an elastomeric and polymer materials.

9. The mower, according to claim 1, wherein said mower includes means for adjusting vertical position of each of said pair of front ground cover engaging wheels relative to said frame.

10. The mower, according to claim 9, wherein said vertical position adjusting means includes a pair of crank mechanisms, each of said pair of crank mechanisms operatively connected to a respective one of said pair of front ground cover engaging wheels and having a manually operable handle.

11. The mower, according to claim 1, wherein said mower includes means for adjusting vertical position of said at least one blade.

12. A human powered ground cover mower comprising:

(a) a frame, said frame including an elongated tubular member disposed in a substantially vertical plane at an angle relative to said ground cover, a hollow cylinder secured to a lower end of said elongated member and having an axis thereof aligned in a horizontal plane when said mower is in use for mowing said ground cover and in a direction transverse to a direction of mowing, a first fork extending in a rearward direction and having a common end thereof secured to one end of said elongated member, and a second fork extending in said rearward direction and having a common end thereof secured to an opposed end of said elongated member, whereby respective free ends of said first and second forks are rigidly attached to each other;

(b) an elongated base attached mediate ends thereof to said frame, said elongated base disposed substantially horizontally when said mower is in said use for mowing said ground cover in said direction transverse to said direction of mowing, said elongated base having a pair of substantially planar spaced apart surfaces defining a uniform thickness throughout, wherein said hollow cylinder is disposed a predetermined distance above a top surface of said elongated base;

(c) a handle assembly having a generally U-shaped portion, each free end of said generally U-shaped portion pivotally connected to respective end of said elongated base, a first elongated tubular member secured to said U-shaped portion, at least one second elongated member disposed for linear telescopic motion within said first elongated tubular member and a handle secured to a free end of said at least one second elongated member;

(d) a rear axle affixed generally horizontally to said free ends of said first and second forks;

(e) a rear wheel mounted on said rear axle for rotation thereabout;
(f) a pair of front ground cover engaging wheels, each of said pair of front wheels rotatably affixed to said respective end of said elongated base;
(g) a front axle passed through said hollow cylinder and having each end thereof positioned in close proximity to said respective end of said elongated base;
(h) a pair of first bearings assemblies, each of said pair of bearing assemblies having a housing thereof secured to said respective end of said elongated base in spaced relationship with said top surface thereof and having a bearing thereof mounted within said housing and operatively receiving a respective end of said front axle so that said front axle rotates about a horizontally disposed rotational axis;
(i) a pair of second bearing assemblies, each of said pair of second bearing assemblies having a housing thereof secured to said top surface of said elongated base mediate said respective end thereof and said hollow cylinder;
(j) a pair of vertically disposed shafts, each of said pair of shafts having an upper portion thereof operatively received in a respective second bearing assembly so that said each shaft is free to rotate;
(k) a pair of generally flat cutting blades, each of said pair of cutting blades secured to a lower end of a respective shaft for rotation in said horizontal plane;
(l) a pair of plates, each of said pair of plates secured to an upper end of said respective shaft substantially parallel to said top surface of said elongated base;
(m) a pair of resilient members, each of said pair of resilient members caged between a top surface of a respective second bearing assembly and a bottom surface of a respective plate and applying upward force thereto;
(n) a pair of friction wheels, each of said pair of friction wheels adjustably secured on said front axle mediate said respective end of said elongated base and said hollow cylinder and having a peripheral edge thereof disposed in each of a predetermined alignment and predetermined frictional engagement with a top surface of said respective plate;
(o) a sprocket wheel secured on said rear spindle for rotation therewith;
(p) means for adjusting rotational speed of said pair of blades, said means including a derailleur mechanism mounted on said front axle, a shift level affixed to said handle and a Bowden cable having one end thereof secured to said derailleur mechanism and having an opposed end thereof secured to said shift lever;
(q) a drive chain wrapped around said sprocket wheel and a sprocket portion of said derailleur mechanism; and
(r) a shroud at least partially enclosing front portion of said mower.

13. The mower, according to claim 12, wherein said mower includes means at least disposed on said top surface of said respective plate for facilitating frictional engagement with a respective friction wheel.

14. The mower, according to claim 12, wherein each of said plate and said friction wheel is at least partially manufactured from at least one of an elastomeric and polymer material.

15. The mower, according to claim 12, wherein said mower includes means for independently adjusting vertical position of each of said pair of blades.

16. The mower, according to claim 15, wherein said vertical position adjusting means includes a thread formed on a lower portion of said each shaft adjacent said lower end thereof and wherein said each blade is secured to said each shaft with a pair of fasteners each abuttingly engaging a respective surface of said each blade.

17. A human powered ground cover mower comprising:
(a) a frame, said frame including an elongated tubular member disposed in a substantially vertical plane at an angle relative to said ground cover, a hollow cylinder secured to a lower end of said elongated member and having an axis thereof aligned in a horizontal plane when said mower is in use for mowing said ground cover and in a direction transverse to a direction of mowing, a first fork extending in a rearward direction and having a common end thereof secured to one end of said elongated member, and a second fork extending in said rearward direction and having a common end thereof secured to an opposed end of said elongated member, whereby respective free ends of said first and second forks are rigidly attached to each other;
(b) an elongated base attached mediate ends thereof to said frame, said elongated base disposed substantially horizontally when said mower is in said use for mowing said ground cover in said direction transverse to said direction of mowing, said elongated base having a pair of substantially planar spaced apart surfaces defining a uniform thickness throughout, wherein said hollow cylinder is disposed a predetermined distance above a top surface of said elongated base;
(c) a handle assembly having a generally U-shaped portion, each free end of said generally U-shaped portion pivotally connected to respective end of said elongated base, a first elongated tubular member secured to said U-shaped portion, at least one second elongated member disposed for linear telescopic motion within said first elongated tubular member and a handle secured to a free end of said at least one second elongated member;
(d) a rear axle affixed generally horizontally to said free ends of said first and second forks;
(e) a rear wheel mounted on said rear axle for rotation thereabout;
(f) a pair of front ground cover engaging wheels, each of said pair of front wheels rotatably affixed to said respective end of said elongated base;
(g) a front axle passed through said hollow cylinder and having each end thereof positioned in close proximity to said respective end of said elongated base;
(h) a pair of first bearings assemblies, each of said pair of bearing assemblies having a housing thereof secured to said respective end of said elongated base in spaced relationship with said top surface thereof and having a bearing thereof mounted within said housing and operatively receiving a respective end of said front axle so that said front axle rotates about a horizontally disposed rotational axis;
(i) a pair of second bearing assemblies, each of said pair of second bearing assemblies having a housing thereof secured to said top surface of said elongated base mediate said respective end thereof and said hollow cylinder;
(j) a pair of vertically disposed shafts, each of said pair of shafts having an upper portion thereof operatively received in a respective second bearing assembly so that said each shaft is free to rotate;
(k) a pair of generally flat cutting blades, each of said pair of cutting blades secured to a lower end of a respective shaft for rotation in said horizontal plane;
(l) a pair of first beveled gears, each of said pair of first beveled gears secured to an upper end of said respective shaft substantially parallel to said top surface of said elongated base;

(m) a pair of second beveled gears, each of said pair of second beveled gears secured on said front axle mediate said respective end of said elongated base and said hollow cylinder in a predetermined meshing engagement with a respective one of said pair of first beveled gears;

(n) a sprocket wheel secured on said rear spindle for rotation therewith;

(o) means for adjusting rotational speed of said pair of blades, said means including a derailleur mechanism mounted on said front axle, a shift level affixed to said handle and a Bowden cable having one end thereof secured to said derailleur mechanism and having an opposed end thereof secured to said shift lever;

(p) a drive chain wrapped around said sprocket wheel and a sprocket portion of said derailleur mechanism; and (q) a shroud at least partially enclosing front portion of said mower.

* * * * *